(12) United States Patent
Spring (10) Patent No.: US 7,057,316 B2
(45) Date of Patent: Jun. 6, 2006

(54) DOWNHOLE TORQUE GENERATOR

(76) Inventor: Gregson William Martin Spring, 7 Great Calcroft, Defford Road, Pershore, Worcestershire WR10 1QS (GB)

( * ) Notice: Subject to any disclaimer, the term of this patent is extended or adjusted under 35 U.S.C. 154(b) by 0 days.

(21) Appl. No.: 10/476,427

(22) PCT Filed: May 1, 2002

(86) PCT No.: PCT/GB02/01993

§ 371 (c)(1),
(2), (4) Date: Oct. 30, 2003

(87) PCT Pub. No.: WO02/091554

PCT Pub. Date: Nov. 14, 2002

(65) Prior Publication Data

US 2004/0140726 A1   Jul. 22, 2004

(30) Foreign Application Priority Data

May 5, 2001   (GB) .................................. 0111124.4

(51) Int. Cl.
H02K 5/10   (2006.01)
(52) U.S. Cl. .................. 310/87; 310/61; 417/423.3
(58) Field of Classification Search ................ 310/166, 310/168, 52, 54–59, 60 R, 61–63, 87, 90, 310/156.45, 156.46; 417/423.3, 423.7, 423.12, 417/423.13
See application file for complete search history.

(56) References Cited

U.S. PATENT DOCUMENTS

| 1,912,586 | A | * | 6/1933 | Lysholm ...................... 310/61 |
| 2,768,583 | A | * | 10/1956 | Albert et al. ................ 417/354 |
| 2,802,957 | A | * | 8/1957 | Gievers ..................... 310/67 R |
| 3,462,626 | A | * | 8/1969 | Kluss .......................... 310/114 |
| 3,978,354 | A | * | 8/1976 | Lee et al. ................. 310/60 R |
| 4,025,960 | A | * | 5/1977 | Gray et al. ................. 310/168 |
| 4,916,346 | A | * | 4/1990 | Kliman ........................ 310/216 |
| 5,095,238 | A | * | 3/1992 | Suzuki et al. .......... 310/156.46 |
| 5,642,010 | A | * | 6/1997 | Carosa et al. ............... 310/211 |
| 5,959,380 | A | * | 9/1999 | Gillett et al. .................. 310/54 |
| 6,081,058 | A | * | 6/2000 | Suzuki et al. .......... 310/156.45 |
| 6,204,588 | B1 | * | 3/2001 | Springer ..................... 310/261 |
| 6,396,190 | B1 | * | 5/2002 | Ahn et al. ................... 310/261 |

FOREIGN PATENT DOCUMENTS

| DE | 19856224 | 6/2000 |
| EP | 0520733 | 12/1992 |
| EP | 0607429 | 7/1994 |
| EP | 0728908 | 8/1996 |

OTHER PUBLICATIONS

International Search Report Aug. 16, 2002.

* cited by examiner

*Primary Examiner*—Dang Le
(74) *Attorney, Agent, or Firm*—Ira S. Dorman (57) ABSTRACT

A torque-generating apparatus includes a first assembly (10, 25) including a generally cylindrical member of magnetically soft material and having a longitudinal axis and a second assembly (2) arranged coaxially within the first assembly and including an electromagnetic winding (4). The first assembly (10, 25) and the second assembly (2) are rotatable relative to each other about the axis. Relative rotation between the first (10, 25) and second (2) assemblies induces a magnetic field which generates rotational torque between the first and second assemblies.

24 Claims, 6 Drawing Sheets

DOWNHOLE TORQUE GENERATOR

This invention relates to the field of torque-generating apparatus. More particularly, but not exclusively, the invention relates such apparatus for down hole use in drilling applications.

In oilfield exploration or extraction applications, a drill string is used to drill a well bore. In order to provide directional control of the drill string, a bent section of drill collar (commonly referred to as a bent sub) may be used. This section of the drill string is called the orienter. The bent sub may be rotated about the longitudinal axis of the drill string so as to provide directional control. The orientation of the bent sub is commonly controlled by a conventional electric motor and reduction gear box, powered from the surface via a wire line connection. Directional control of the drill string is achieved by rotating the bent sub, straight drilling being achieved by continuously rotating the bent sub so as to eliminate any drilling bias.

The present system has many disadvantages. The power for the down hole electric motor is commonly provided by a very high-voltage, high-current power supply (e.g. 1 KV with 3 Amps current capacity). Voltages and currents of this magnitude are needed to overcome the high electrical losses in the very long cables used to supply the down hole instrumentation. The arrangement is not power-efficient and requires specialist equipment in order for the wire line apparatus to function. Furthermore, although this system has been used fairly satisfactorily for many years, its performance and reliability is compromised at high ambient working temperatures which may exceed 150° C. Conduction losses in the copper windings and magnetic hysteresis losses in the ferrous frame of the motor add to the thermal stress imposed by this high ambient temperature. These and other factors lead to a shortening of the working life of an electrical motor in these conditions. This is a major drawback in drilling applications—should the motor fail down hole, the string cannot be steered, and drilling may be prematurely stopped. The motor then has to be replaced, which can lead to significant and costly drilling downtime. A more reliable motor would therefore lead to decreased downtime, giving lower operating costs.

One conventional approach to down hole drilling uses a rotating drill string. In such an apparatus, a steering tool is required which is able to maintain a stable position in relation to a rotating drilling pipe. One proposed solution has been to provide two electrical generators, mounted to the top and bottom of the steering tool respectively, the generators having opposing turbine blades and rotating in opposite directions in the flow of drilling mud so as to cancel some of the natural background torque introduced by the turbines. This tactic allows the tool some measure of platform stability.

However, in reality one generator always exhibits more rotational loss than the other, resulting in a net torque which slowly rotates the steering tool. To eliminate this error, an onboard microprocessor is provided so that an electrical load might be applied to one or other generator so as to correct the undesired rotation. This solution uses conventional electrical generators and, although it has been very effective up to a point, presents some practical problems.

In the conventional apparatus, the stator is an integral part of the steering tool and the rotor is allowed freely to rotate in the drilling mud. To achieve the required levels of torque, short circuit armature current is drawn from the electrical generators. This causes a considerable heating effect within the armature winding space. Whilst the drilling mud removes some heat, the winding temperature cannot be kept within safe limits at the high ambient temperatures encountered in down hole drilling. In ambient temperatures of the region of 150° C., the winding insulation suffers severe thermal stress and usually fails after only a few hours, leading to costly downtime. This failure is symptomatic of the design of the apparatus and cannot be avoided. This type of tool is therefore not suitable for high-premium, high-temperature wells.

Furthermore, present apparatus is vulnerable to the aggregation of mud and debris leading to clogging of the machinery and down hole failure.

There is therefore a requirement for an improved apparatus avoiding the above disadvantages. In particular, there is a requirement for an apparatus that is reliable and efficient in operation, with an improved lifetime. There is in addition a requirement for an apparatus which is less susceptible to thermal failure and clogging problems.

EP-A-0 607 429 describes an induction motor of the outer rotor-type in which rotor windings are arranged on the outer side of the stator windings. A stator frame is provided with a hub and a stator winding is mounted on the outer periphery of the hub via a yoke. A rotary shaft is rotatably supported by a hole in the hub and the rotor frame is held at the outer end of the rotary shaft. A rotor winding of the rotor frame is arranged on the side of the outer periphery of the stator winding.

DE-A-198 56 224 describes an electromagnetic unit comprising magnetic North poles arranged at a distance to South poles in the peripheral direction about a rotation axis on a magnetic body containing a magnetic coil. A hysteresis ring connected to the rotor is movable with respect to the poles. The peripheral surfaces of the North and South poles lie on the same circle and are relative to the same peripheral surface of the hysteresis ring.

It is an object of the present invention to provide a torque-generating apparatus capable of fulfilling at least some of the above requirements.

According to the present invention there is provided a torque-generating apparatus comprising: a first assembly including a generally cylindrical member of magnetically soft material and having a longitudinal axis; a second assembly arranged coaxially within the first assembly and including an electromagnetic winding, the first assembly and the second assembly being rotatable relative to each other about the axis; the arrangement being such that relative rotation between the first and second assemblies induces a magnetic field which generates rotational torque between the first and second assemblies, characterised in that the first and second assemblies define therebetween a substantially annular space for the passage of a fluid and in that a plurality of longitudinal grooves are provided in an inside surface of the cylindrical member, the longitudinal grooves being adapted to prevent an aggregation of particulate material from the fluid flowing between the first and second assemblies.

A "magnetically soft material" is a material which is not capable of being substantially permanently magnetised, but which becomes magnetised whilst in an externally applied magnetic field.

The first assembly may be a rotor assembly of the apparatus for producing rotational torque and the second assembly may be a stator assembly of the apparatus.

The second assembly may comprise a magnetically soft steel.

The first and second assemblies may be separated by a narrow gap.

The first assembly may be disposed so as substantially to surround the second assembly.

The first assembly may be substantially solid or may be formed from a plurality of laminations.

The first assembly formed from a plurality of laminations may comprise a number of conductors running the length of the first assembly and connected at each end of the first assembly by means of a conductor end cap.

The conductors and the end caps may comprise material resistant to mechanical abrasion and chemical attack from drilling muds, for example beryllium copper.

The second assembly may be substantially solid or may be formed from a plurality of laminations.

The grooves may be substantially coaxial with the longitudinal axis of the first assembly. Alternatively, the grooves may be provided so as to form at least a partial helix around the longitudinal axis of the first assembly.

The second assembly may be provided with a number of pole pieces extending generally radially from the longitudinal axis thereof. The pole pieces of the second assembly may be provided with an electromagnetic winding, adjacent poles being magnetisable in opposite directions. Means may be provided to control the degree of the magnetisation. Gaps between the pole pieces may be filled with a potting material. The surface of the second assembly may be covered with a layer of soft magnetic or non-magnetic material.

The second assembly may be provided with an external power supply. The power supply may comprise a direct current power supply in the form of a battery, or a generator provided with rectification means.

The generator may be provided with external rotation means adapted to rotate contrary to the rotational direction of the first assembly.

The first assembly may be provided with external rotation means such as impeller means adapted to rotate the first assembly, the impeller means being adapted to be disposed in use within a moving fluid, the motion of the fluid acting upon the impeller means so as to rotate the first assembly. The impeller means may be demountably attached to the first assembly.

The invention may comprise a torque-generating apparatus as described above for use in a down hole drilling apparatus, the fluid which acts to rotate the impeller being drilling mud. The down hole drilling apparatus may include a drill head, the drill head being provided with associated stabilising means which include a torque-generating apparatus as described above, the torque-generating apparatus acting to provide a controllable amount of torque to stabilise the orientation of the drill head. Wire line drilling apparatus may be provided including a rotatable bent sub, rotation of the bent sub being effected using a torque-generating apparatus according to the invention.

For a better understanding of the present invention and to show more clearly how it may be carried into effect, reference will now be made, by way of example, to the accompanying drawings which show schematically various embodiments of the present invention. The figures may not be to scale. In the drawings.

Figure 1:
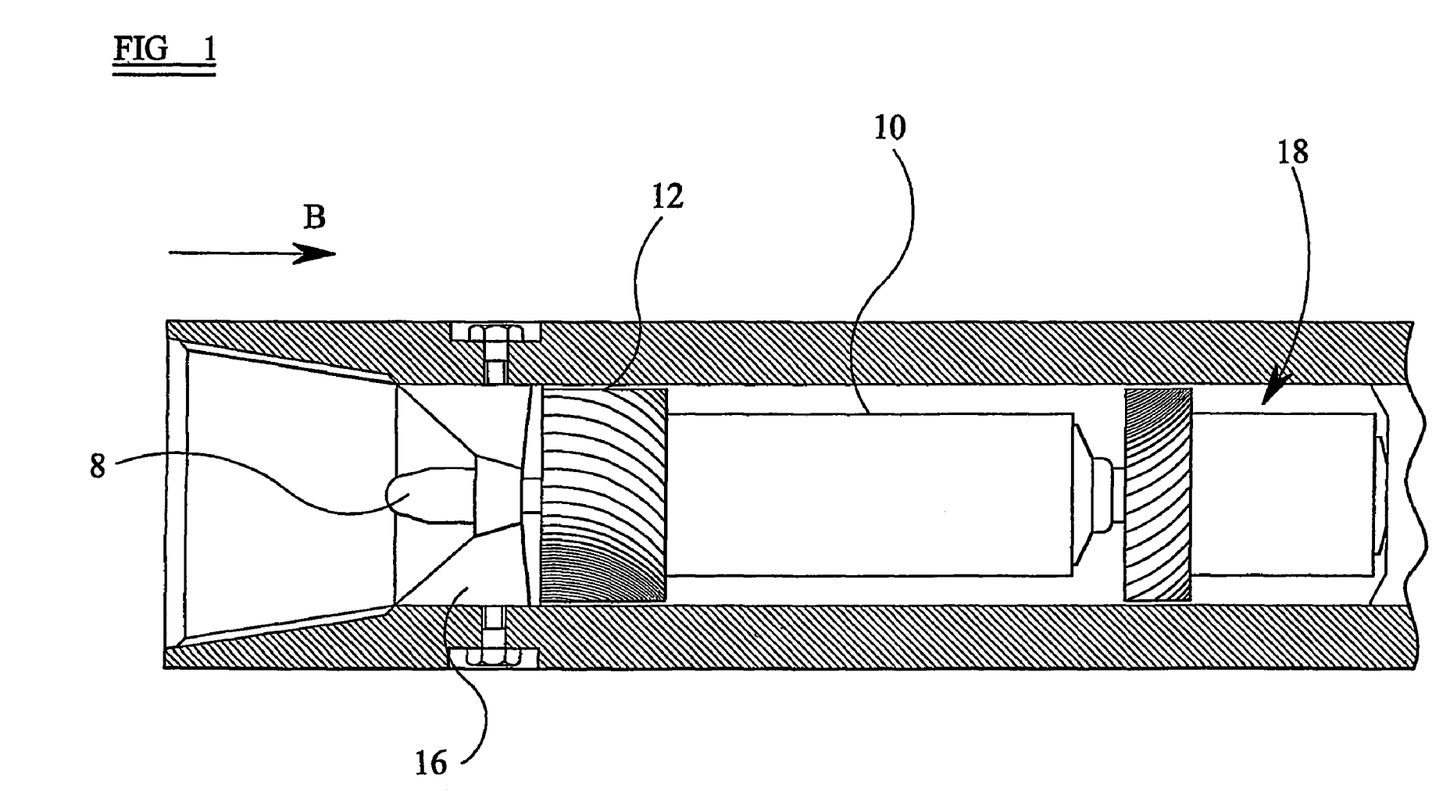
FIG. 1 is an elevational view, partly in section, of a torque-generating apparatus according to the present invention.
Figure 2:
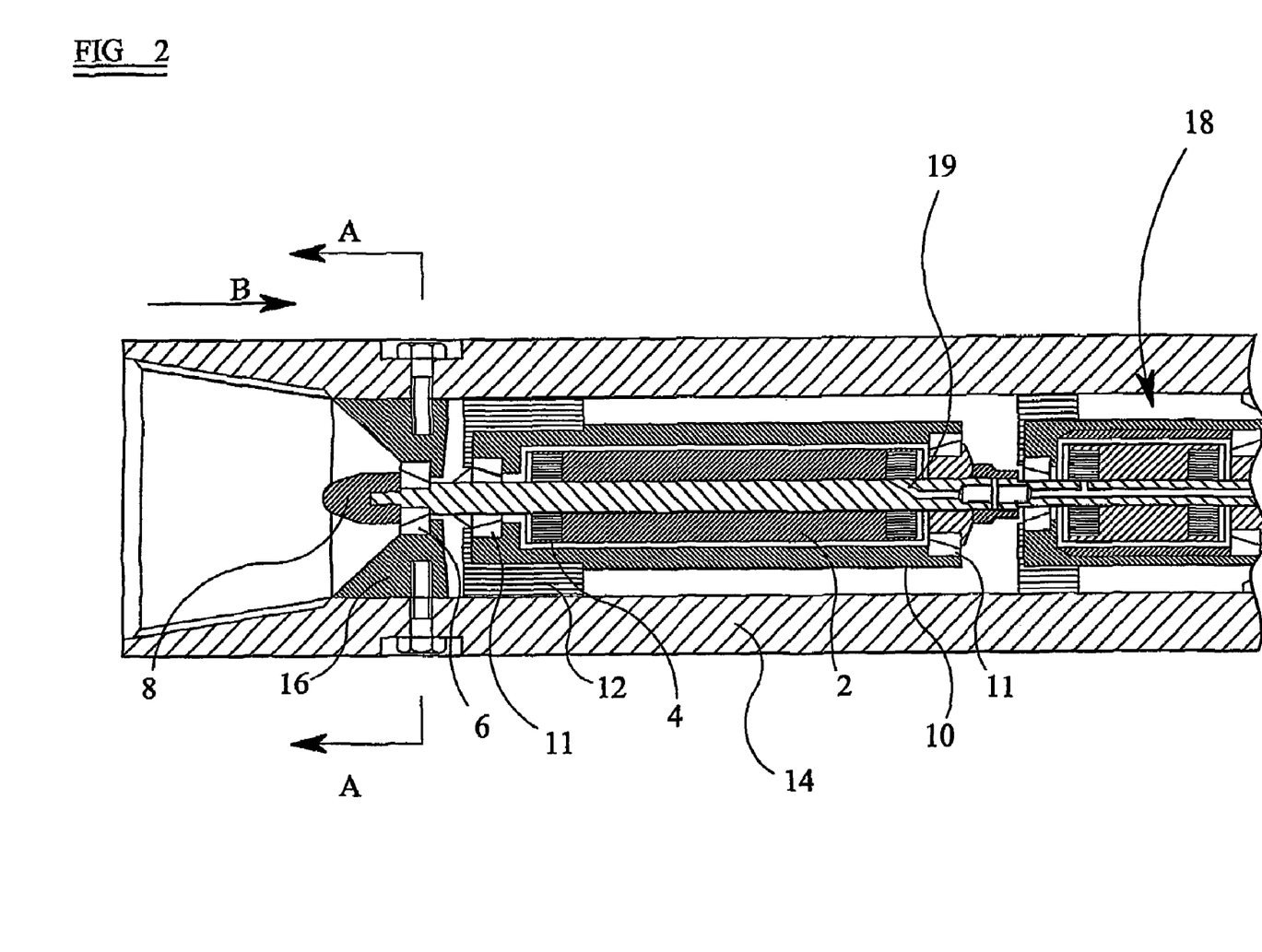
FIG. 2 is cross-sectional view of the apparatus of FIG. 1.

FIGS. 1 and 2 show a torque generating apparatus suitable for use in drilling apparatus. As shown in FIG. 2, the apparatus comprises a second assembly in the form of a cylindrical stator 2 which is rotatable about its longitudinal axis. The stator 2 is shown in more detail in FIGS. 5 to 8. The stator is made of magnetically soft material and is provided with stator windings 4 arranged so that, when energised, the stator 2 is magnetised as discussed below. The stator is supported on bearings 6, such as thrust bearings, and has an output shaft 8. Surrounding the stator is a first assembly in the form of a magnetically soft steel rotor 10. The rotor 10 is mounted on the stator 2 by way of bearings 11, such as thrust bearings. The rotor has associated with it impeller blades 12, rotation of which cause the rotor 10 to rotate. The rotor/stator assembly is contained within a cylindrical housing 14 which may typically be a section of drill collar. The assembly is supported by an anchor and bearings 16 which are bolted to the housing. An electrical supply, in this case an electrical alternator/generator 18, is provided so that the stator windings 4 may be energised. The electrical supply may alternatively be a battery or other direct current power source (none shown). The power source may rotate with the apparatus, or may be stationary, being connected to the stator windings 4 via e.g. slip rings (not shown). The stator windings 4 are connected to windings of the alternator by way of access holes 19 formed in the core of each apparatus as shown in FIG. 2. In use, the apparatus is disposed down hole, drilling mud being pumped down the hole in the direction indicated. The moving drilling fluid acts on the impeller 12 so as to rotate the rotor 10. Even with no electrical current supplied, some rotation of the stator 2 occurs, due to residual magnetism in the rotor 10 and stator bodies and residual coupling torque between the rotor and stator bearings. However, upon energisation of the stator windings 4, stator rotation is increased, the amount of rotation being controllable by controlling the current supplied to the stator windings. This control may be suitably effected by onboard circuitry (not shown) controlled by e.g. a microprocessor, and may conveniently be exercised remotely, e.g. from the surface. Alternatively or additionally, a closed-loop control system may be provided so that the electromagnetic field strength may be adjusted to maintain a constant torque, avoiding torque ripple due to small variations in mud-pump and rotor speeds.

In practice, operating efficiency is maximised by employing moderate electromagnetic drive/voltage current together with the highest practical rotor speed for all mud flow rates. The magnitude of output torque is a function of machine size and may be scaled for bigger or smaller machines.

Figure 3:
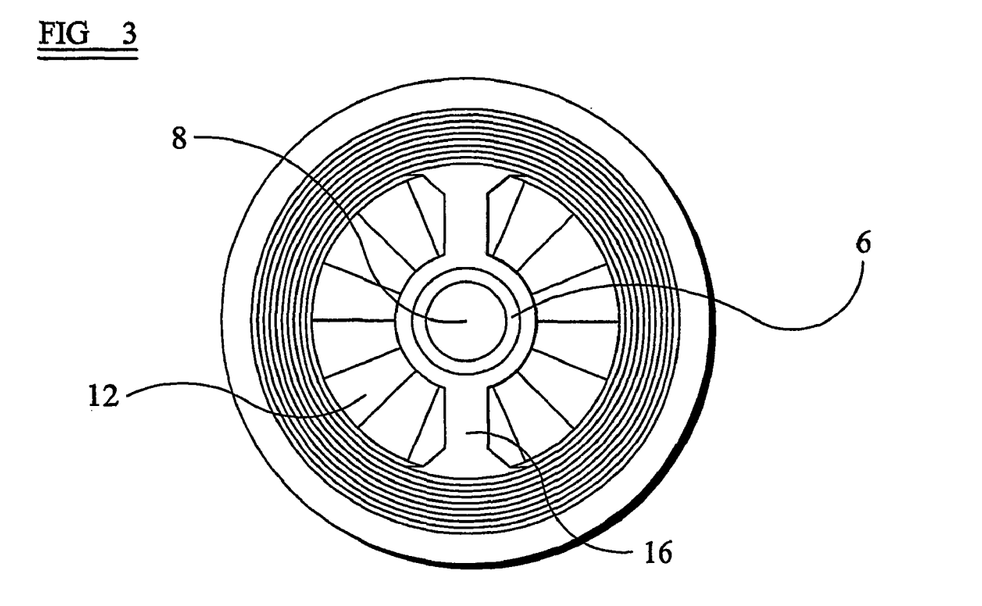
FIG. 3 is an end view of the apparatus of FIG. 1 looking in the direction of the arrow B in FIG. 1.

FIG. 3 is an end view of the apparatus of FIG. 1. It shows the output shaft 8 with associated bearing 6 and also shows the impeller blades 12. The direction of mud flow in FIG. 3 is into the paper, causing rotation of the impeller blades.

Figure 4:
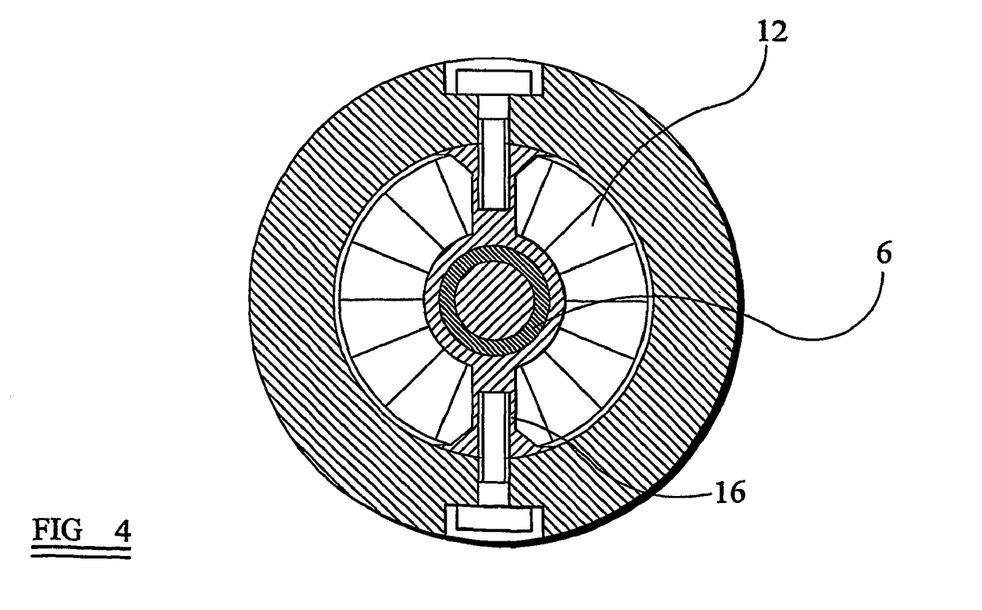
FIG. 4 is a cross-sectional view of the apparatus of FIG. 1 taken along the line A—A shown in FIG. 2.
Figure 5:
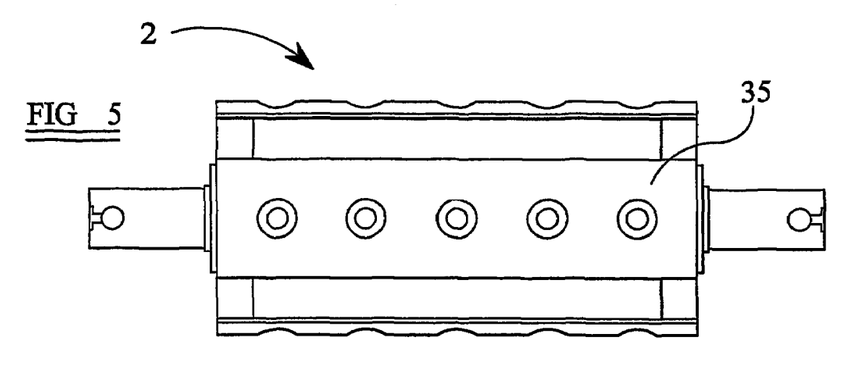
FIG. 5 is a more detailed view of a stator shown in FIG. 2.
Figure 6:
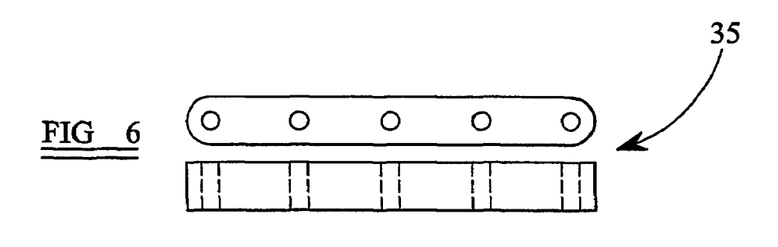
FIG. 6 shows two views of a stator pole piece.
Figure 7:
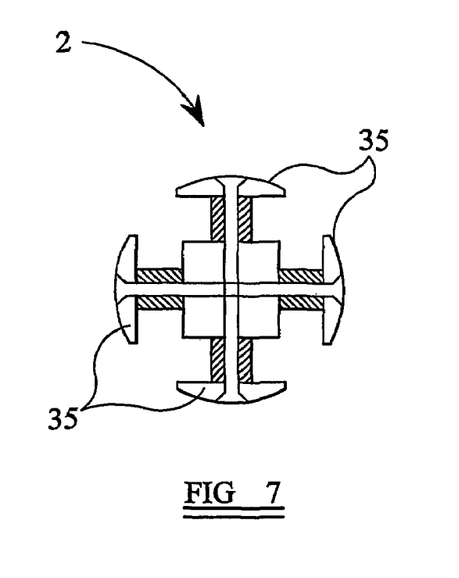
FIG. 7 is a cross-section of the stator shown in FIG. 5.
Figure 8:
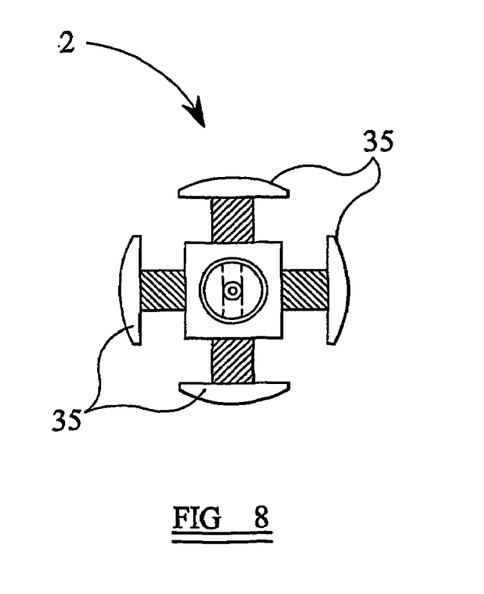
FIG. 8 is an end view of the stator shown in FIG. 5.

FIG. 4 shows a cross-sectional view as indicated in FIG. 2. The assembly anchor and bearing 16 is shown in cross-section, bolted to the drill collar housing. The output shaft 8 can be seen in cross-section. The view in FIG. 4 is looking inwards into the assembly in the direction of the incoming mud, and the impeller blades 12 can be seen behind the assembly anchor 16.

The impeller 12 is a component which suffers high wear and needs frequent replacement. As such it is demountably attached to the rotor 10, in this case having a screw thread which co-operates with a corresponding thread on the rotor.

FIGS. 5 to 8 are more detailed views of the stator assembly. The stator 2 is a simple four-pole electromagnet which forms the electrical and mechanical centre of the machine. The stator 2 has a central shaft from which radially project four pole pieces 35, as shown. The number of pole pieces need not be limited to four—any suitable number of pole pieces may be provided, larger machines requiring more pole pieces.

To prevent the stator 2 from being crushed by normal down hole drilling pressures, the gaps between the stator pole pieces may be filled with a high compressive strength material such as epoxy filler (not shown). This allows the stator 2 to maintain its shape and survive pressures in excess of 20,000 pounds per square inch.

Figure 11:
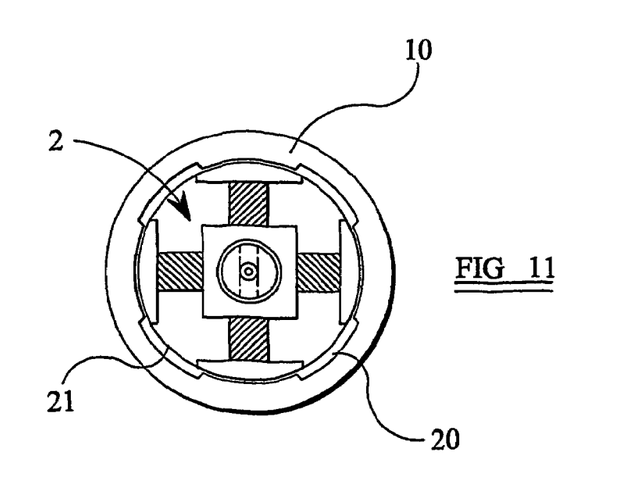
FIG. 11 is an end view detail of the rotor and stator assembly.

The stator 2 is wound with high-temperature-resistant enamelled copper wire (not shown in FIGS. 5 to 8) so as to produce alternate north and south magnetisation of the pole pieces. To preserve the integrity of the stator winding from the drilling mud, as shown in FIGS. 2 and 11 a thin sleeve of soft magnetic or non-magnetic material 21 is machined to cover the stator windings. End cheeks provided on the stator receive the sleeve 21 and are welded thereto to seal the assembly. This seals the edges of the stator 2 and protects the contents from contamination. The covering, for example in the form of a cylinder, allows the stator poles to rotate with respect to the rotor 10 whilst maintaining close magnetic contact. A small magnetic gap is required to create the high output torque reactions from this machine.

An important feature of the apparatus is the use of electromagnetic advantage to minimise the power demands of the stator 2. By their nature, induction machines rely upon high rates of change of magnetic flux to rotate the rotor or stator. High operating efficiency will therefore be achieved at high RPM.

Figure 9:
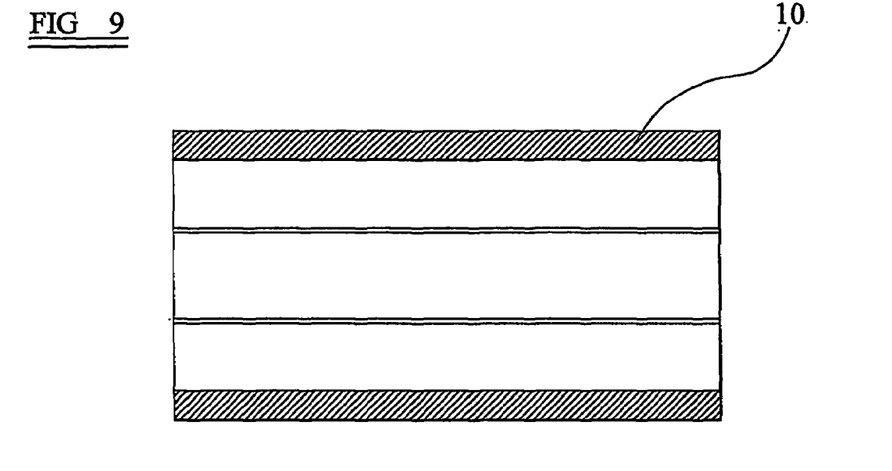
FIG. 9 is a sectional view of a rotor shown in FIG. 2.
Figure 10:
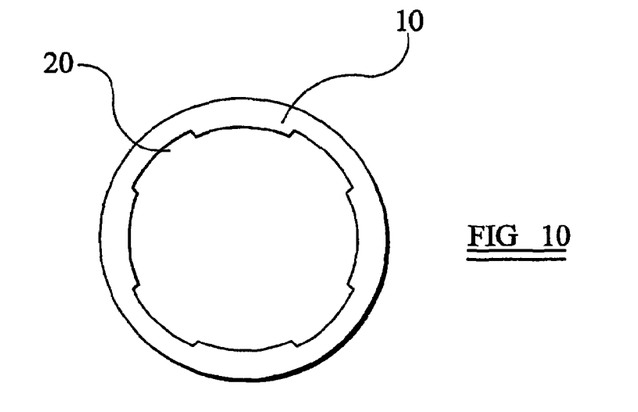
FIG. 10 is an end view of the rotor of FIG. 9.

FIGS. 9 to 11 show the rotor 10 in more detail. The rotor 10 consists of a simple steel cylinder having grooves 20 machined to the inside surface. The grooves 20 perform two important functions. They allow the rotor 10 and stator 2 to maintain close magnetic contact and at the same time allow a sufficient flow of drilling mud through the annular space between the rotor and stator. This aids lubrication of the rotor bearings 11 and allows dissipation of heat.

The grooves 20 also prevent mud particles from aggregating within the annular space and clogging the apparatus. If the annular space were too small, mud particles would become trapped due to low mud-flow velocities. The mud particles would quickly aggregate, binding the stator 2 and rotor 10 and causing a down hole failure. In conventional electrical apparatus using a permanent magnet rotor, failure frequently occurs due to mud material becoming trapped and clogged within the space between the rotor and stator. The clogging problem is compounded by both soft and hard magnetic particles that circulate within the mud. Once trapped by the strong magnetic fields within the permanent magnet rotor, the magnetic particles capture non-magnetic mud particles, accelerating clogging. A conventional permanent magnet torque-generating apparatus (torquer/motor) can seize and fail very quickly. The present apparatus avoids this type of failure by providing a more generous space between rotor and stator (due to the grooves) and by being composed of soft magnetic material which does not trap particles to the same extent as a permanent magnet.

An important feature of the present apparatus is the use of electromagnetic advantage and a solid rotor 10 to dissipate waste heat from work done by the apparatus. The induced currents circulating in the rotor 10 would give rise to $I^2R$ heating in the rotor raising its working temperature. However, because the rotor 10 is manufactured from a magnetically soft material, its performance is unaffected by this temperature rise. It can therefore operate in temperatures much higher than the current limit of 180 C., without any loss of performance. In theory, the rotor 10 alone can operate at temperatures up to 500 C., but in practice this is limited by the temperature limit of the rotor support bearings 11.

According to another realisation of the rotor 10, not shown in the figures, the grooves 20 are formed with a small flute or spiral twist along their length. In this way, every rotation of the rotor 10 produces a small pumping effect, pumping mud and contaminant particles through the apparatus. Should the apparatus begin to foul with magnetic particles, the blockage may be cleared by allowing the apparatus to run without electromagnetic excitation. With no magnetic attraction, particles are easily expelled. Normal energisation of the electromagnet can then be resumed. This feature could be programmed into the apparatus as a general housekeeping function, which would further improve the reliability of the apparatus.

The pole pieces of the stator 2 and the protruding portions of the rotor inner surface are disposed so as to correspond, being aligned (in the case of a four-pole apparatus) every quarter turn of the rotor 10. As discussed, the number of pole pieces and protruding portions may be varied to suit a particular application. Although the rotor 10 and stator 2 in this example are formed of magnetically soft steel, any suitable soft magnetic material may be employed. Similarly, the protective coating of the stator 2 may be made of ferrous or non-ferrous material.

Normal use of the apparatus may erode the inner surface of the rotor 10 and/or the protective coating of the stator 2. This would cause a gradual loss of output torque. The apparatus is, however, easy and economical to repair, as any mechanical errors may be easily corrected by welding, machining and/or grinding the relevant part.

For the generation of output torque, the present invention requires an external power source to excite the electromagnet. Whilst batteries are commonly used to power down hole instruments, an alternative solution is to add a small down hole alternator/generator to the apparatus. The generator rotor (see FIGS. 1 and 2) is allowed to rotate freely and independently of the rotor 10 and may incorporate a power-conditioning electronic circuit to regulate power to the stator electromagnet. Due to the high operating efficiency of the apparatus, the generator may be of modest design with an output of say, 50 Watts. Any suitable conventional generator may be employed, e.g. a multipole permanent-magnet rotor and a three-phase wound stator. Such generators are commonly provided down hole to power down hole instrumentation. Although in FIGS. 1 and 2 the generator and torque-generating apparatus are shown in close physical proximity, they may in fact be located some distance apart.

In situations where a generator is not suitable, current may be provided via a wire line. This would necessitate the provision of e.g. slip rings or bearings so as to maintain electrical contact between the apparatus and the non-rotating wire line connection.

As discussed, the apparatus may be used as a torquer, providing a controlled torque so as to stabilise the drilling apparatus. An apparatus according to the invention may alternatively be used as a motor, providing rotation of the bent sub. The only difference between the apparatus used as a torquer or as a motor is the stator RPM. A potential problem of the apparatus used as a motor is the loss of differential speed between the generator rotor and stator. The torque reaction between any rotor and stator pair drags the stator around its axis in the same direction as the rotor. If both the torquer and generator impeller blades rotate in the same direction, this leads to a reduced differential speed between the generator rotor and stator leading to loss of output. However, if the blades are arranged so as to rotate in opposite directions, this prevents generator output failure when the apparatus is operated as a motor, as the differential speed is increased. The system is therefore self-compensating to some degree and its stability is improved. Use of the apparatus as a motor may necessitate the provision of a reduction gearbox for increased torque.

Figure 12:
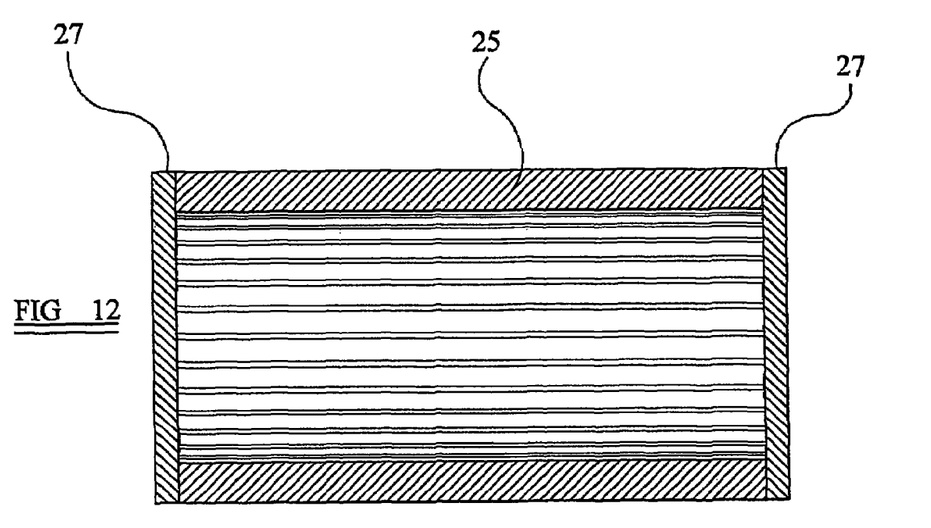
FIG. 12 is a cross-sectional view of another embodiment of a rotor similar to that shown in FIG. 2 showing a laminated structure.
Figure 13:
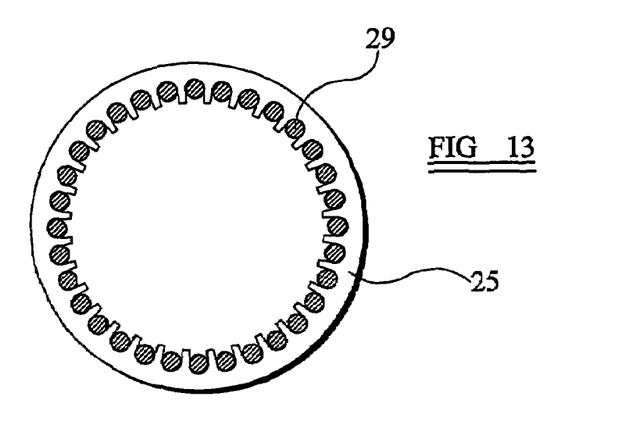
FIG. 13 is an end view of the rotor of FIG. 12.
Figure 14:
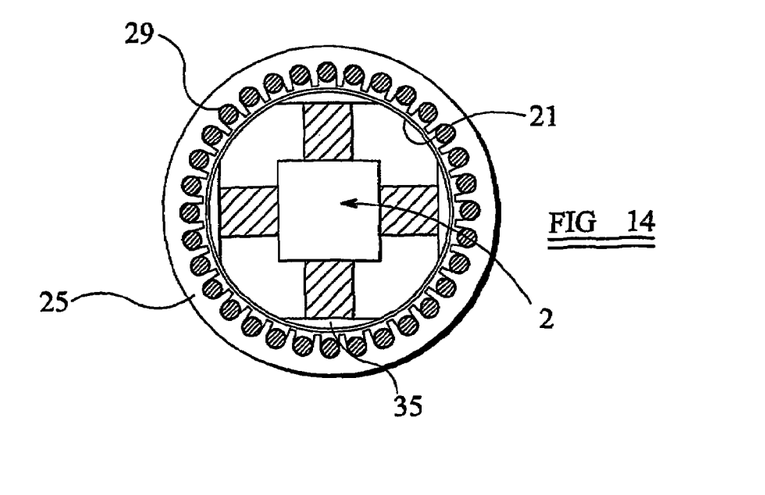
FIG. 14 is an end view detail of a rotor and stator assembly incorporating the rotor of FIGS. 12 and 13.

FIGS. 12 to 14 show an alternative rotor 25 in more detail. The rotor 25 consists of a laminated steel cylinder having a number of conductors 29 running the length of the rotor 25. The conductors 29 are connected at each end of the rotor 25 by means of a conductor end cap 27. The arrangement of conductors 29 and end caps 27 form what is known as a squirrel cage conductor winding.

The conductors 29 and conductor end caps 27 consist of rods and plates of beryllium copper, which has a similar electrical resistivity to aluminium but is a stronger material, resistant to mechanical abrasion and chemical attack from drilling muds.

A close magnetic contact is still maintained between the rotor 25 and the stator 2.

It should be understood that the stator which can be in a solid or laminated form can be used in conjunction with either a solid or laminated rotor.

The invention claimed is:

1. A down-hole torque-generating apparatus comprising: a first assembly (10, 25) including a generally cylindrical member of magnetically soft material and having a longitudinal axis and a wall thickness; a second assembly (2) arranged coaxially within the first assembly and including an electromagnetic winding (4), the first assembly (10, 25) and the second assembly (2) being rotatable relative to each other about the axis; the arrangement being such that relative motion between the first (10, 25) and second (2) assemblies induces a magnetic field which generates rotational torque between the first and second assemblies; a substantially annular space defined between the first and second assemblies for the passage of drilling mud therethrough; a plurality of longitudinal grooves (20) provided in an inside surface of the cylindrical member of magnetically soft material, the magnetically soft material of the first assembly being positioned adjacent to the substantially annular space between the first assembly and the second assembly and the longitudinal grooves (20) extending only partially through the wall thickness of the cylindrical member of magnetically soft material; and control means for controlling energisation of the electromagnetic winding (4) whereby the electromagnetic winding (4) is temporarily de-energised to allow the torque-generating apparatus to run without electromagnetic excitation such that magnetic particles are expelled from the torque-generating apparatus.

2. An apparatus as claimed in claim 1, wherein the first assembly is a rotor assembly (10, 25) of the apparatus for producing rotational torque and the second assembly is a stator assembly (2) of the apparatus.

3. An apparatus as claimed in claim 1, wherein the second assembly (2) comprises a magnetically soft steel.

4. An apparatus as claimed in claim 1, wherein the first assembly (10, 25) is disposed so as substantially to surround the second assembly (2).

5. An apparatus as claimed in claim 1, wherein the first assembly is of a form selected from substantially solid (10) and formed from a plurality of laminations (25).

6. An apparatus as claimed in claim 5, wherein the first assembly formed from a plurality of laminations (25) comprises a number of conductors (29) running the length of the first assembly (29) and connected at each end of the first assembly (25) by means of a conductor end cap (27).

7. An apparatus as claimed in claim 6, wherein the conductors (29) and the end caps (27) comprise material resistant to mechanical abrasion and chemical attack from drilling muds.

8. An apparatus as claimed in claim 6, wherein the conductors (29) and end caps (27) comprise beryllium copper.

9. An apparatus as claimed in claim 1, wherein the second assembly (2) is of a form selected from substantially solid and formed from a plurality of laminations.

10. An apparatus as claimed in claim 1, wherein the grooves (20) are substantially coaxial with the longitudinal axis of the first assembly (10).

11. An apparatus as claimed in claim 1, wherein the grooves (20) are provided so as to form at least a partial helix around the longitudinal axis of the first assembly (10).

12. An apparatus as claimed in claim 1, wherein the second assembly (2) is provided with a number of pole pieces extending generally radially from the longitudinal axis thereof.

13. An apparatus as claimed in claim 12, wherein the pole pieces of the second assembly (2) are provided with an electromagnetic winding, adjacent poles being magnetisable in opposite directions.

14. An apparatus as claimed in claim 12, wherein means is provided to control the degree of the magnetisation.

15. An apparatus as claimed in claim 12, wherein gaps between the pole pieces are filled with a potting material.

16. An apparatus as claimed in claim 12, wherein the surface of the second assembly (2) is covered with a layer selected from soft magnetic and non-magnetic material.

17. An apparatus as claimed in claim 1, wherein the second assembly is provided with an external power supply (18).

18. An apparatus as claimed in claim 17, wherein the power supply (18) comprises a direct current power supply in a form selected from a battery and a generator provided with rectification means.

19. An apparatus as claimed in claim 18, wherein the generator is provided with external rotation means adapted to rotate contrary to the rotational direction of the first assembly.

20. An apparatus as claimed in claim 1, wherein the first assembly (10, 25) is provided with external rotation means (12) adapted to rotate the first assembly.

21. An apparatus as claimed in claim 20, wherein the external rotation means comprises impeller means (12).

22. An apparatus as claimed in claim 21, wherein the impeller means (12) is adapted to be disposed in a flow of drilling mud, the motion of the drilling mud acting upon the impeller means (12) so as to rotate the first assembly (10, 25).

23. An apparatus as claimed in claim 21, wherein the impeller means (12) is demountably attached to the first assembly (10, 25).

24. A method of removing magnetic particles from a down-hole torque-generating apparatus positioned in a flow of drilling mud, the torque-generating apparatus comprising a first assembly (10, 25) including a generally cylindrical member of magnetically soft material and having a longitudinal axis and a wall thickness; a second assembly (2) arranged coaxially within the first assembly and including an electromagnetic winding (4), the first assembly (10, 25) and the second assembly (2) being rotatable relative to each other about the axis; the arrangement being such that relative motion between the first (10, 25) and second (2) assemblies induces a magnetic field which generates rotational torque between the first and second assemblies; a substantially annular space defined between the first and second assemblies for the passage of drilling mud therethrough; a plurality of longitudinal grooves (20) provided in an inside surface of the cylindrical member of magnetically soft material, the magnetically soft material of the first assembly being positioned adjacent to the substantially annular space between the first assembly and the second assembly and the longitudinal grooves (20) extending only partially through the wall thickness of the cylindrical member of magnetically soft material; and control means for controlling energisation of the electromagnetic winding (4); said method comprising the steps of positioning the torque-generating apparatus down-hole in a drilling installation in a flow of drilling mud such that drilling mud passes through the substantially annular space between the first and second assemblies; energising the electromagnetic winding (4) so as to transfer torque from the first assembly to the second assembly; and temporarily de-energising the electromagnetic winding (4), using the control means, to allow the torque generator to run without electromagnetic excitation, whereby magnetic particles are expelled from the torque-generating apparatus.

* * * * *